(12) United States Patent
Lee

(10) Patent No.: US 9,268,355 B2
(45) Date of Patent: Feb. 23, 2016

(54) FAUCET HANDLE EXTENDER

(71) Applicant: Peachy LLC, Alamo, CA (US)

(72) Inventor: Susanna Lee, Alamo, CA (US)

(73) Assignee: Peachy LLC, Alamo, CA (US)

( * ) Notice: Subject to any disclaimer, the term of this patent is extended or adjusted under 35 U.S.C. 154(b) by 57 days.

(21) Appl. No.: 13/870,971

(22) Filed: Apr. 25, 2013

(65) Prior Publication Data

US 2013/0283962 A1    Oct. 31, 2013

Related U.S. Application Data

(60) Provisional application No. 61/638,758, filed on Apr. 26, 2012.

(51) Int. Cl.
*F16K 31/60* (2006.01)
*G05G 1/06* (2006.01)
*E03C 1/04* (2006.01)

(52) U.S. Cl.
CPC ............... *G05G 1/06* (2013.01); *E03C 1/0412* (2013.01); *F16K 31/60* (2013.01); *Y10T 74/20612* (2015.01)

(58) Field of Classification Search
CPC ......... F16K 31/60; E03C 1/0412; G05G 1/06; Y10T 74/20612
USPC ............ 16/427, 422, 429; 81/124.5; 251/291, 251/293, 292; 137/801; 4/675–678
See application file for complete search history.

(56) References Cited

U.S. PATENT DOCUMENTS

| | | | | |
|---|---|---|---|---|
| 4,266,320 A | * | 5/1981 | Grant | 16/427 |
| 4,562,758 A | * | 1/1986 | Stirling | 81/124.4 |
| 5,465,749 A | * | 11/1995 | Sauter et al. | 137/315.15 |
| 5,557,955 A | * | 9/1996 | Kinsella | 70/177 |
| 6,360,402 B1 | * | 3/2002 | Crabtree | 16/430 |
| 2011/0042600 A1 | * | 2/2011 | Malone et al. | 251/293 |

FOREIGN PATENT DOCUMENTS

| | | |
|---|---|---|
| JP | H11124887 A | 5/1999 |
| WO | 2013163485 A1 | 10/2013 |

OTHER PUBLICATIONS

"Int'l Application Serial No. PCT/US2013/038300, Search Report & Witten Opinion mailed Aug. 19, 2013", 14 pgs.

* cited by examiner

*Primary Examiner* — John K Fristoe, Jr.
*Assistant Examiner* — Andrew J Rost
(74) *Attorney, Agent, or Firm* — Kwan & Olynick LLP

(57) ABSTRACT

A faucet handle extender includes an attachment member configured to selectively couple with a faucet handle. The faucet handle extender also includes an extension member coupled with the attachment member. Movement of the extension member causes movement of the faucet handle.

20 Claims, 12 Drawing Sheets

FAUCET HANDLE EXTENDER

RELATED APPLICATIONS

This application claims the benefit of U.S. Provisional Application No. 61/638,758, filed Apr. 26, 2012.

TECHNICAL FIELD

The current disclosure relates to faucet handle attachments generally and specifically to faucet handle extender attachments used to enable people to effectively gain access to water through faucets with handles that would otherwise be beyond their arm reach.

BACKGROUND

When children are young it is common for parents to assist their children in reaching water faucets. Like adults, children need to wash their hands, gain access to drinking water, or access tap water for countless other reasons. Unlike adults, children have a shorter arm reach which can interfere with the usage of faucets that are generally designed for adult use.

Some methods to solve this problem that have been used include direct parental assistance and the use of foot stools. There are distinct disadvantages to these methods. Adults sometimes are unable or unavailable to assist children, and foot stools require large amounts of floor space.

The problem is not limited to young children. People with disabilities, the elderly, people with dwarfism, people with arthritis or back pain, or other adults may find it difficult to reach faucet handles to control water-flow from a faucet.

Thus, there exists a need for a device that allows the above mentioned children and people to gain easier access to a faucet handle.

SUMMARY

A faucet handle extender comprises an attachment member configured to selectively couple with a faucet handle. The faucet handle extender also includes an extension member coupled with the attachment member. Movement of the extension member causes movement of the faucet handle.

DETAILED DESCRIPTION

Figure 1:
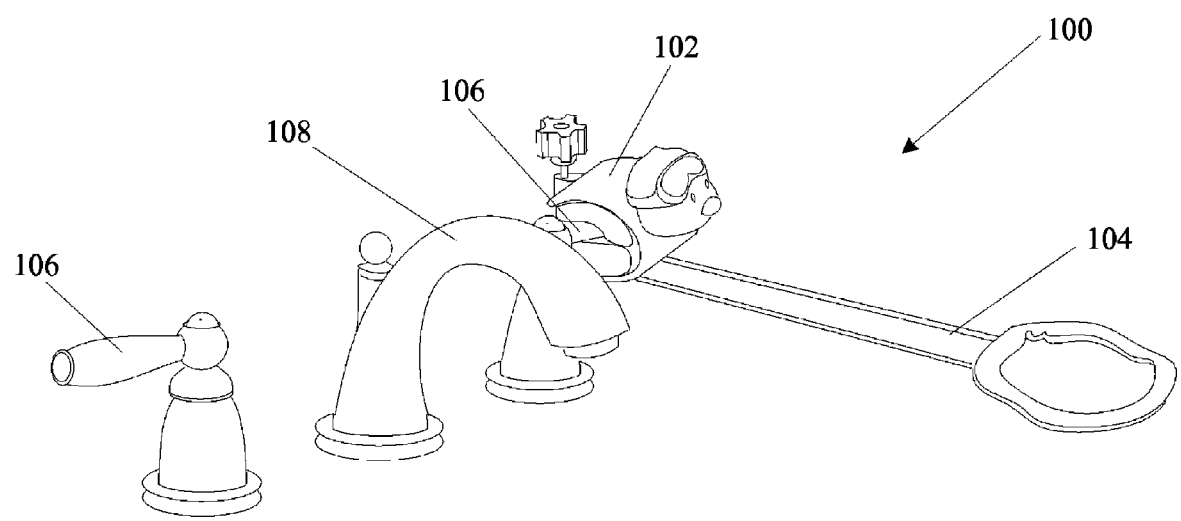
FIG. 1 depicts a faucet handle extender coupled to a faucet handle of a dual handle faucet, in accordance with some embodiments of the present disclosure.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

As used herein, "fastening" is used synonymously with "tightening." For example, a "fastening mechanism" refers to a "tightening mechanism" and vice versa.

As used herein, a "unit" is used synonymously with a "member," a "piece," or a "portion." Thus, an "attachment unit" is synonymous with an "attachment member" and/or an "attachment portion."

As used herein, "rotatably coupled" refers to coupling of at least two elements wherein at least one element is free to rotate or swivel around the point of coupling.

As used herein, "removably coupled" refers to coupling of at least two elements wherein the elements are detachable from the coupling. Thus, for example, if an attachment unit is removably coupled to an extension piece, then the attachment unit can be detached from the extension piece.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

In one aspect of the present disclosure, a faucet handle extender comprises an attachment member configured to selectively couple with a faucet handle. The faucet handle extender also includes an extension member coupled with said attachment member. Movement of the extension member causes movement of the faucet handle.

In some embodiments, the faucet handle extender includes a fastening mechanism. The fastening mechanism is configured to fasten the attachment member to the faucet handle. In some embodiments, the fastening mechanism is adjustable.

In some implementations, the attachment member includes a gripping mechanism to assist in coupling with the faucet handle. In various embodiments, the gripping mechanism comprises a flexible or compressible material.

In some implementations, the extension member is coupled to the attachment member such that the extension member may rotate around an axis perpendicular to the length of the extension member. In some embodiments, the faucet handle extender of claim 1, wherein the extension member includes an aperture at the end of the extension member distal to the coupling end. In some implementations, the faucet handle extender comprises one or more restricting members coupled with either the attachment member or the extension member. The one or more restricting members are configured to prevent the extension member from moving in a particular direction when coupled to the faucet handle.

In some implementations, the faucet handle extender also comprises a blocking mechanism attached to the attachment member or the extension member. The blocking mechanism is configured to prevent the attachment member from coupling with the faucet handle in a particular orientation.

In another aspect of the present disclosure, a faucet handle attachment unit comprises an outer shell at least partially defining an interior space. The outer shell is configured such that a faucet handle can be inserted through the interior space. This allows the faucet handle attachment unit to couple with the faucet handle. In some embodiments, the faucet handle attachment unit further comprises a gripping mechanism coupled to the outer shell. The gripping mechanism is configured to contact one or more surfaces of the faucet handle when the faucet handle attachment unit is coupled with the faucet handle. In some embodiments, the gripping mechanism includes one or more cushions coupled to one or more interior surfaces of the outer shell. The one or more cushions at least partially protrudes into the interior space. In some embodiments, the one or more cushions comprise neoprene, rubber, sponge, foam, or any other compressible materials that allow the faucet handle attachment unit to couple with various types and shapes of faucet handles.

In various embodiments, the outer shell comprises two or more outer shell pieces connected through a connection mechanism. In some embodiments, the connection mechanism comprises one or more latches, locks, switches, hinges, snaps, bolts, screws, adhesives, hooks, fasteners, or any other connection device. In some embodiments, the faucet handle attachment unit further comprises a fastening mechanism to fasten the faucet handle attachment unit to the faucet handle. The fastening mechanism comprises one or more screws, straps, clamps, levers or any other mechanisms for tightening and/or securing the faucet handle attachment unit to the faucet handle.

In various embodiments, the faucet handle attachment unit further comprises an extender attachment mechanism. The extender attachment mechanism is configured such that a faucet handle extension unit can couple with the faucet handle attachment unit. In some embodiments, the extender attachment mechanism is configured to allow the faucet handle extension unit to rotate or swivel around the point of connection to the faucet handle attachment unit.

In yet another aspect of the present disclosure, a combined system comprises a faucet handle coupled to a faucet handle extender. The faucet handle extender comprises an attachment member configured to selectively couple with the faucet handle. The faucet handle extender also comprises an extension member coupled with said attachment member. The movement of the extension member causes movement of said faucet handle.

FIG. 1 depicts an embodiment of a faucet handle extender 100 coupled with a faucet handle 106. In some embodiments, the faucet handle extender 100 comprises an attachment unit 102 and an extension piece 104. In some embodiments, the attachment unit 102 is removably coupled with faucet handle 106 that controls a faucet 108. In some embodiments, the extension piece 104 can be rotatably coupled with the attachment unit 102. As used herein, "rotatably coupled" refers to extension piece 104 being able to rotate or swivel around the connection or coupling point. Thus, in some embodiments, extension piece 104 is coupled with attachment unit 102 such that extension piece 104 can rotate or swivel around the point at which extension piece 104 is coupled to attachment unit 102. In other embodiments, the extension piece 104 can be fixed relative to the attachment unit 102.

Figure 2:
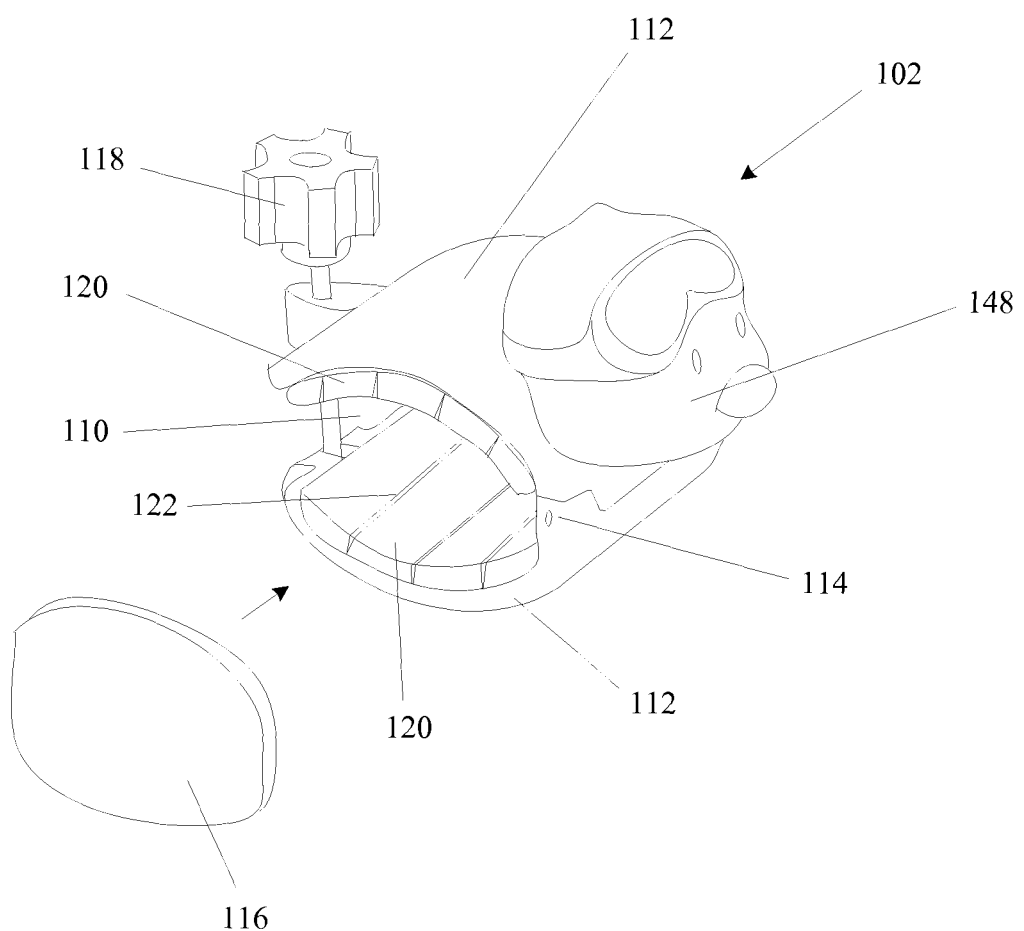
FIG. 2 depicts an attachment unit of a faucet handle extender, in accordance with some embodiments of the present disclosure.

FIG. 2 depicts an exemplary embodiment of an attachment unit 102. The attachment unit 102 can be configured to selectively attach to a faucet handle 106. In some embodiments, the attachment unit 102 can at least partially define an interior space 110 into which a faucet handle 106 can be placed, such that the attachment unit 102 can be secured to the faucet handle 106. In some embodiments, the attachment unit 102 can comprise one or more outer shells 112 that can at least partially define an interior space 110. In alternate embodiments, the attachment unit 102 can comprise straps that can be tied around a faucet handle 106, loops and/or apertures that a faucet handle 106 can be passed at least partially through, hardware that can replace at least a portion of a faucet handle 106, clamps that can be secured to a faucet handle 106, or any other device that can be selectively coupled with a faucet handle 106.

In some embodiments in which the attachment unit 102 comprises one or more shells 112, attachment unit 102 can comprise a plurality of shells 112 that can be selectively and/or permanently coupled with one another via a connection mechanism 114. In some embodiments the connection mechanism 114 can be a hinge that allows the shells 112 to move relative to one another. In other embodiments, the connection mechanism 114 can be one or more latches, locks, interlocking parts, switches, snaps, bolts, screws, adhesives, hook and loop fasteners, fusing, or any other connection device. In alternate embodiments in which the attachment unit 102 comprises one or more shells 112, attachment unit 102 comprises a single shell 112 that can be at least partially hollow to accept a faucet handle 106. By way of a non-limiting example, a single shell 112 can be substantially U shaped, such that the faucet handle 106 can be placed within the center of the "U" shape. In some embodiments, a single U shaped shell 112 can comprise a flexible material such that attachment unit 102 can conform to various shapes and sizes of faucet handles. In still other embodiments, the attachment unit 102 can be comprised of any other configuration of shells 112. In some embodiments, the shells 112 are comprised of polyethylene. In alternate embodiments, the shells 112 can be comprised of polycarbonate material, acrylonitrile butadiene styrene, metal, metal alloy, plastic, polyvinyl chloride, wood, ceramic, glass, or any other material or combination of materials. In some embodiments, the shells 112 can be comprised of waterproof and/or water resistant materials. In some embodiments, any or all portions of the shells 112 can be covered in and/or coated with rubber, plastic, foam, or any other material.

In some embodiments, one or more stoppers 116 can be provided to close off one or more entrances to the interior space, such that a faucet handle 106 can only enter the interior space 110 from one entrance point so that the attachment unit 102 can only be installed in a specific orientation and/or on a specific faucet handle 106, for example the faucet handle 106 that controls cold water. This is so attachment unit 102 cannot be accidentally coupled to a faucet handle that controls hot water. In some embodiments, stopper 116 can be a separate component that can be selectively coupled with attachment unit 102 via friction fit, snaps, latches, interlocking parts, screws, bolts, or any other connection method. In alternate embodiments, stopper 116 is integral with attachment unit 102 and cannot be removed.

In some embodiments, the fit of the attachment unit 102 around the faucet handle 106 can be adjusted with a fastening/tightening mechanism 118. In some embodiments, tightening mechanism 118 is a screw that can be turned to adjust the volume of the interior space 110 defined by attachment unit 102. In various embodiments in which attachment unit 102 comprises shells 112, tightening mechanism 118 can move the shells 112 closer to one another and/or farther apart from one another to adjust the dimensions of the interior space 110. Thus, in some embodiments, fastening mechanism 118 is adjustable. In other embodiments, tightening mechanism 118 is a ratcheting device that can move the shells 112 closer to one another and/or farther apart from one another. In still other embodiments, tightening mechanism 118 is a lever that applies pressure to the faucet handle 106, a tensioning device, a mechanism to pull straps tighter, a clamp, or any other device that can adjust the dimensions of the interior space 110 and/or operate to fit attachment unit 102 tighter around a faucet handle 106.

In some embodiments, attachment unit 102 can further comprise one or more cushions 120. The cushions 120 can be coupled with one or more portions of the attachment unit 102 that are configured to come into contact with the faucet handle 106 when the faucet handle extender 100 is installed on a faucet handle 106. For example, in FIG. 2, one or more cushions 120 is coupled to one or more interior surfaces of outer shell 112. As used herein, "interior surfaces" refers to the surfaces facing the interior space 110. Thus, in some embodiments, the cushions 120 can be coupled with the portions of the attachment unit 102 that define the interior space 110, such that the interior space 110 is surrounded by the cushions 120. In some embodiments, the cushions 120 are permanently coupled with attachment unit 102 through the use of adhesives, friction fit, interlocking pieces, or any other attachment mechanism. In other embodiments, cushions 120 are removable from the attachment unit 102 when attachment unit 102 is not coupled with a faucet handle 106. In some embodiments, cushions 120 are comprised of foam. In other embodiments, cushions 120 are comprised of any other material such as neoprene, rubber, sponge, or any other soft, elastic, and/or compressible material or combination of materials. In some embodiments, the compressible material allows the cushions to deform to fit around any type or design of faucet handle 106. In some embodiments, cushions 120 comprise notches 122. Notches 122 can extend through at least a portion of the cushions 120.

Figure 3:
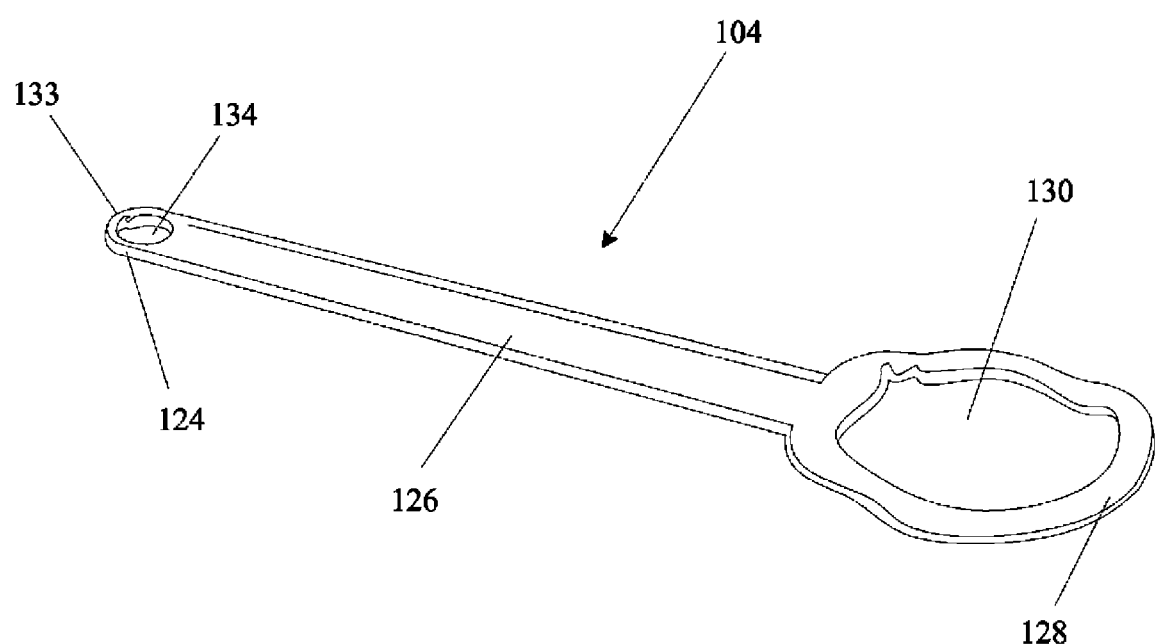
FIG. 3 depicts an extension piece of a faucet handle extender, in accordance with some embodiments of the present disclosure.

FIG. 3 depicts an exemplary embodiment of an extension piece 104. In some embodiments, extension piece 104 is an elongated member having a proximal end 124, a middle section 126, and a distal end 128. As depicted in FIG. 3, proximal end 124 is defined as the end closest to connection point 133. In some embodiments, connection point 133 on extension piece 104 is defined by an aperture 134 into which an extender attachment mechanism, e.g. protrusion 132, on attachment unit 102 can be inserted. As depicted in FIG. 3, distal end 124 is defined as the end farthest from connection point 133. In some embodiments, extension piece 104 can have any desired length. In some embodiments, extension piece 104 has a fixed length. In alternate embodiments extension piece 104 is extendable, retractable, and/or has an adjustable length. In some embodiments, distal end 128 can be wider than middle section 126 and/or proximal end 124. In some embodiments, extension piece 104 comprises one or more additional features 130. In some embodiments, additional feature 130 is functional to assist a user in the operation of faucet handle extender 100, such as an aperture that extends through distal end 128 to serve as a handle. In other embodiments, additional feature 130 is a grip, a knob, a notch, a protrusion, a label that marks the faucet handle "hot" or "cold," or any other functional feature.

In some embodiments, extension piece 104 is comprised of polyethylene. In alternate embodiments, extension piece 104 is comprised of polycarbonate material, acrylonitrile butadiene styrene, metal, metal alloy, plastic, polyvinyl chloride, wood, ceramic, glass, or any other material or combination of materials. In some embodiments, extension piece 104 is comprised of waterproof and/or water resistant materials. In some embodiments, any or all portions of extension piece 104 can be covered in and/or coated with rubber, plastic, foam, or any other material.

Figure 4A:
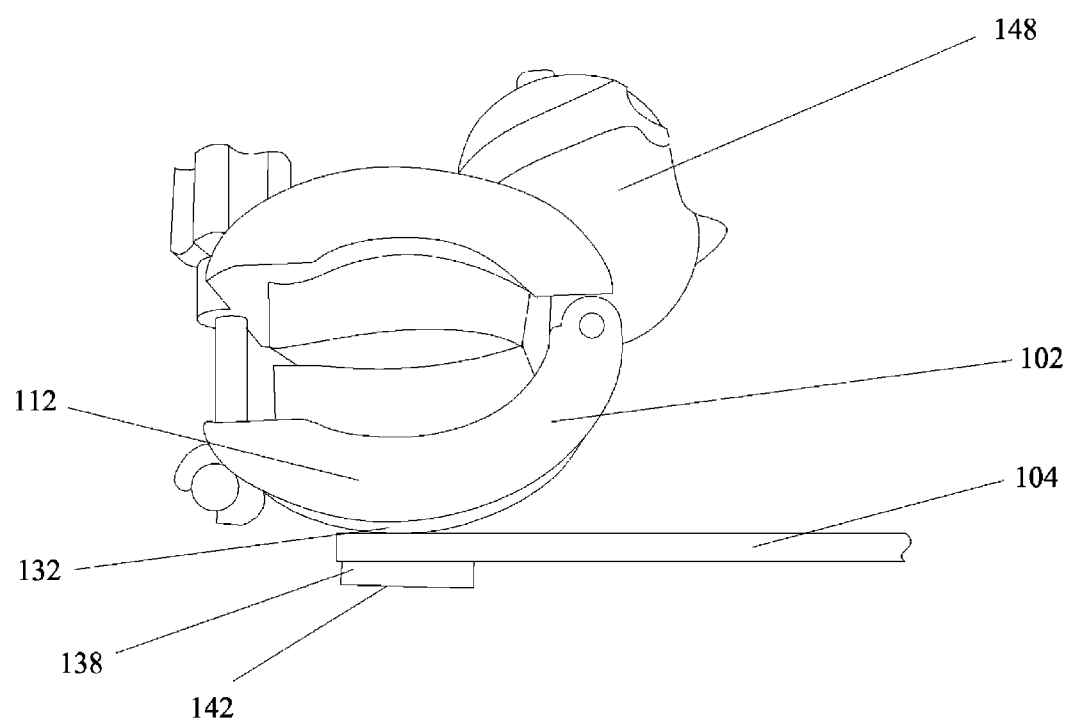
FIG. 4A depicts an exemplary connection between an attachment unit and an extension piece, in accordance with some embodiments of the present disclosure.
Figure 4B:
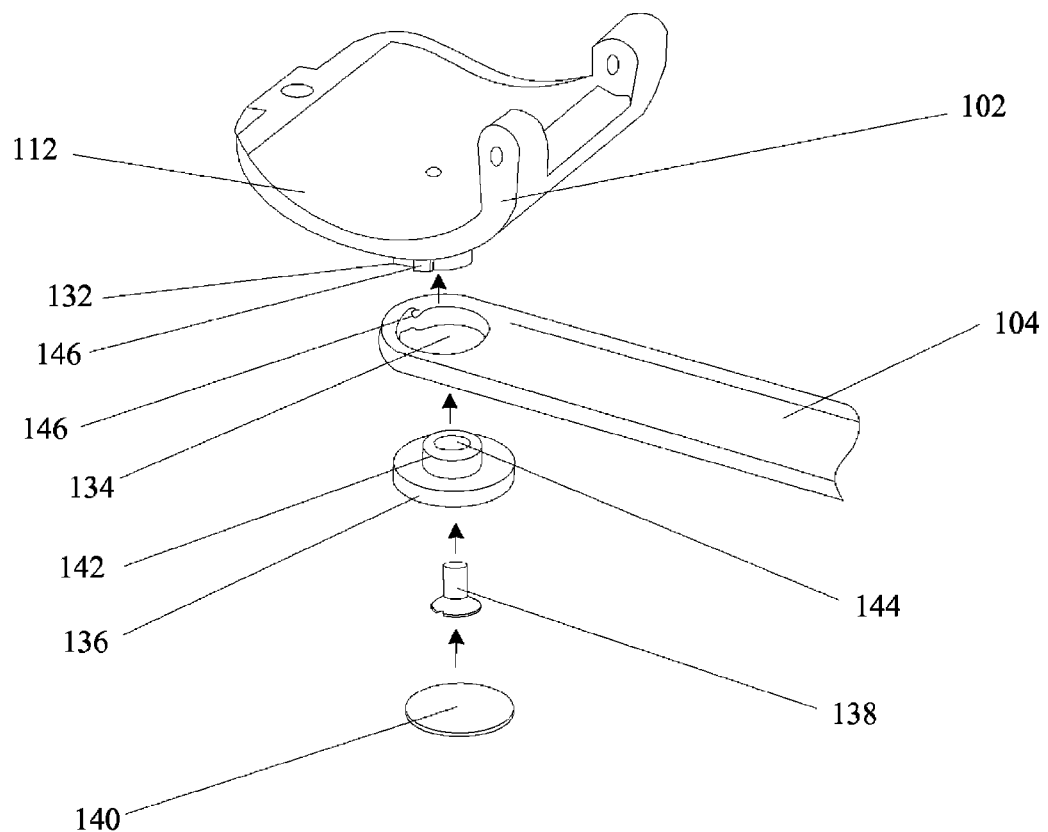
FIG. 4B depicts an exploded view of an exemplary connection between an attachment unit and an extension piece, in accordance with some embodiments of the present disclosure.

FIGS. 4A and 4B depict an exemplary connection between attachment unit 102 and extension piece 104. FIG. 4A depicts a side view of the exemplary connection and FIG. 4B depicts an exploded view of the exemplary connection. In some embodiments, attachment unit 102 comprises a protrusion 132, and extension piece 104 comprises an attachment aperture 134 configured to accept protrusion 132. By way of a non-limiting example, FIG. 4A depicts protrusion 132 extending from the underside of the attachment unit 102. FIG. 4A also shows extension piece 104 including connection aperture 134 at proximal end 124. In alternate embodiments, extension piece 104 comprises protrusion 132 and attachment unit 102 contains connection aperture 134.

In some embodiments, faucet handle extender 100 comprises one or more pieces of additional connection hardware, depicted in FIG. 4B, such as a washer 136, a screw 138, and/or an end cap 140. The additional connection hardware can be used to secure the connection between the attachment unit 102 and the extension piece 104. In some embodiments, washer 136 has a washer protrusion 142 configured to extend through the connection aperture 134 and into an aperture provided in protrusion 132. In some embodiments, washer 136 has a hollow tube 144 extending through washer 136 and washer protrusion 142 such that screw 138 extends through washer 136. Washer 136 passes through the connection aperture 134 and couples with attachment unit 102 via screw 138. In some embodiments, the diameter of washer 136 is larger than the diameter of connection aperture 134, such that extension piece 104 cannot be removed from attachment unit 102 without unsecuring screw 138. In some embodiments, end cap 140 is coupled with washer 136 and/or screw 138 to hide screw 138 from view after extension piece 104 has been coupled with attachment unit 102. In some embodiments, end cap 140 displays a design, logo, image, and/or text.

In alternate embodiments, the attachment unit 102 and the extension piece 104 can be coupled with bolts, hinges, nails, screws, ball bearings, interlocking parts, threaded holes, notches and/or any other hardware or mechanism that can couple the extension piece 104 with the attachment unit 102.

In some embodiments, the attachment unit 102 and the extension piece 104 can be coupled with one another on the underside of the attachment unit 102. In alternate embodiments, the attachment unit 102 and the extension piece 104 can be coupled with one another on a side of the attachment unit 102, the top of the attachment unit 102, or at any other location on the faucet handle extender 100.

In some embodiments, the extension piece 104 can be rotatably coupled with the attachment unit 102. By way of a non-limiting example, the interface between the protrusion 132 and the connection aperture 134 can be smooth such that the walls of the connection aperture 134 can rotate around the protrusion 132. In other embodiments, the connection aperture and/or protrusion 132 can be shaped with notches 146, such that the protrusion 132 can only rotate partially within the connection aperture 134, thereby allowing the extension piece 104 to rotate relative to the attachment unit 102 within a limited angle. In alternate embodiments, the extension piece 104 can be non-rotatably coupled with the attachment unit 102, such that the extension piece 104 is fixed relative to the attachment unit 102.

In some embodiments, the faucet handle extender 100 can further comprise one or more décor elements 148. The décor elements 148 can be integrated with and/or coupled with the attachment unit 102, the extension piece 104, and/or any other portion of the faucet handle extender 100. In some embodiments, the décor elements 148 can be three dimensional figures such as the animal's head shown in FIG. 2. In other embodiments, the décor elements 148 can be designs, logos, images, text, stickers, labels, engravings, paint, molded forms, shapes or figures that protrude from the faucet handle extender 100, or any other decorative feature.

Figure 5A:
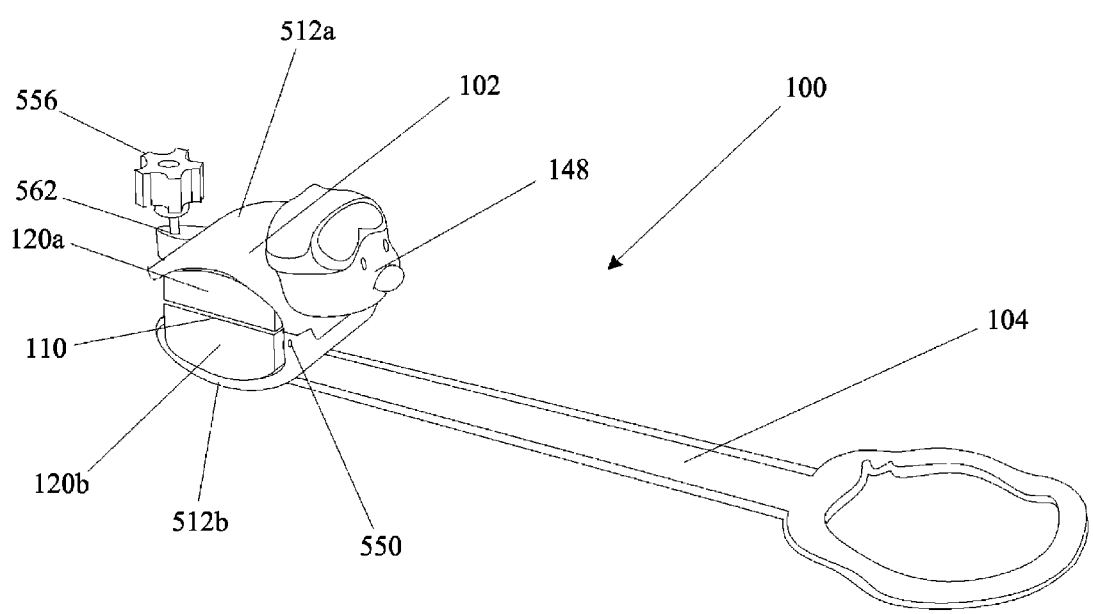
FIG. 5A depicts a first exemplary embodiment of a faucet handle extender, in accordance with some embodiments of the present disclosure.
Figure 5B:
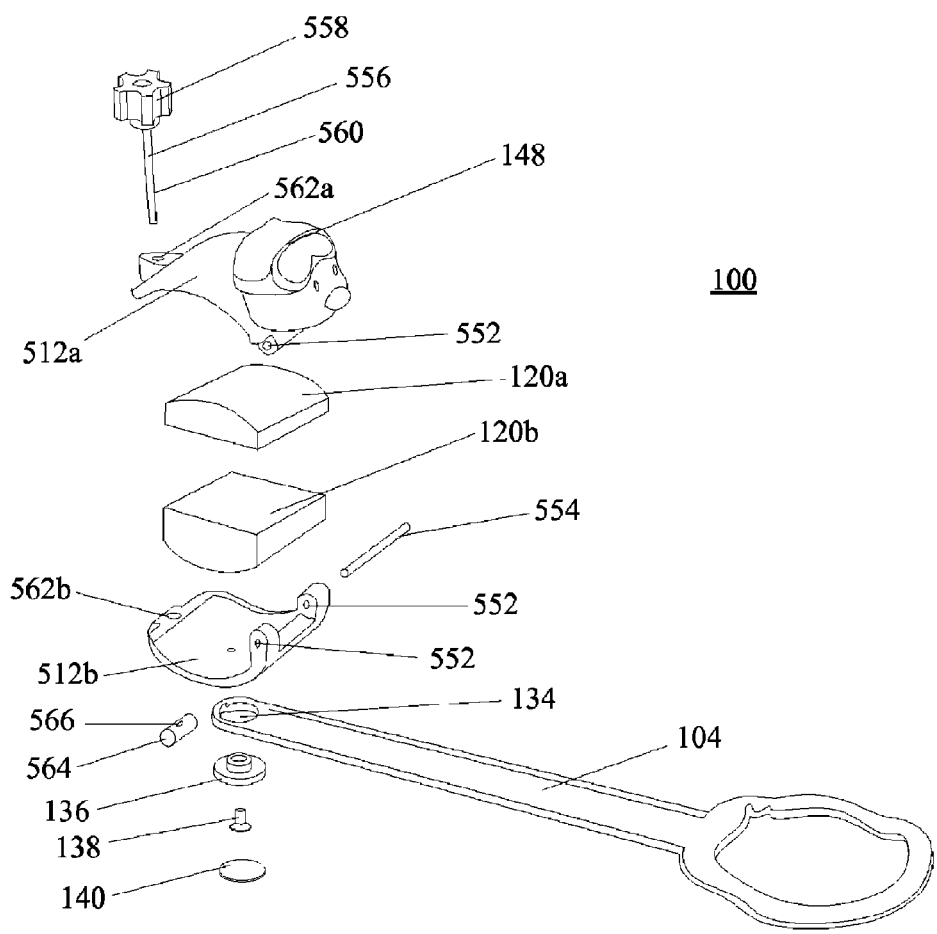
FIG. 5B depicts an exploded view of a first exemplary embodiment of a faucet handle extender, in accordance with some embodiments of the present disclosure.

By way of a non-limiting example, FIGS. 5A and 5B depict a first exemplary embodiment of the faucet handle extender 100. FIG. 5A depicts an isometric view of the first exemplary embodiment in an assembled form, and FIG. 5B depicts an exploded view of the first exemplary embodiment. In this first exemplary embodiment, the attachment unit 102 can comprise an upper shell 512a and a lower shell 512b. In some embodiments, the upper shell 512a and the lower shell 512b can be shaped in opposing arcs, such that the interior space 110 is at least partially defined by the concavity of the arcs of the shells 512 and a faucet handle 106 can be placed within the interior space 110. The attachment unit 102 can comprise an upper cushion 120a, configured to be coupled with the underside of the upper shell 512a, and a lower cushion 120b configured to be coupled with the upper side of the lower shell 512b.

In this first exemplary embodiment, the connection mechanism 114 can be a hinge 550. Each shell 512 can comprise one or more hinge apertures 552 at the front edge of the shell 512, such that a pin 554 can be fed through the hinge apertures 552 of both shells 512 to couple the shells 512 with one another. As used herein, the "front" end refers to the end closest to the distal end of extension piece 104.

As depicted in FIGS. 5A and 5B, the tightening mechanism 118 can be a screw 556. The screw 556 can comprise a screw head 558 and a bolt 560, as shown in FIG. 5B. The bolt 560 can be at least partially threaded. Each shell 512 can comprise a tightening aperture 562 at or proximate to the back edge of the shell 512. As used herein, the "back" end refers to the end farthest from the distal end of the extension piece 104. The tightening apertures 562 can have a diameter capable of accepting the bolt 560 of the screw 556. In some embodiments, one or more of the tightening apertures 562 can be threaded. In other embodiments, a socket piece 564 can be provided that comprises a threaded aperture 566. The socket piece 564 can be placed below the tightening aperture 562b of the lower shell 512b on the underside of the attachment unit 102, such that the threaded aperture 566 of the socket piece 564 can accept the bolt 560 of the screw 556. In operation, the bolt 560 can extend through the attachment unit 102 from above the upper shell 512a through the tightening aperture 562a of the upper shell 512a and the tightening aperture 562b of the lower shell 512b and/or the threaded aperture 566 of the socket piece 564. The screw head 558 can be turned to adjust the width of the space between the back edge of the upper shell 512a and the back edge of the lower shell 512b, thereby adjusting the dimensions of the interior space 110. The front edges of the shells 512 can remain coupled, via hinge 550, while the dimensions of the interior space 110 are adjusted.

Figure 6A:
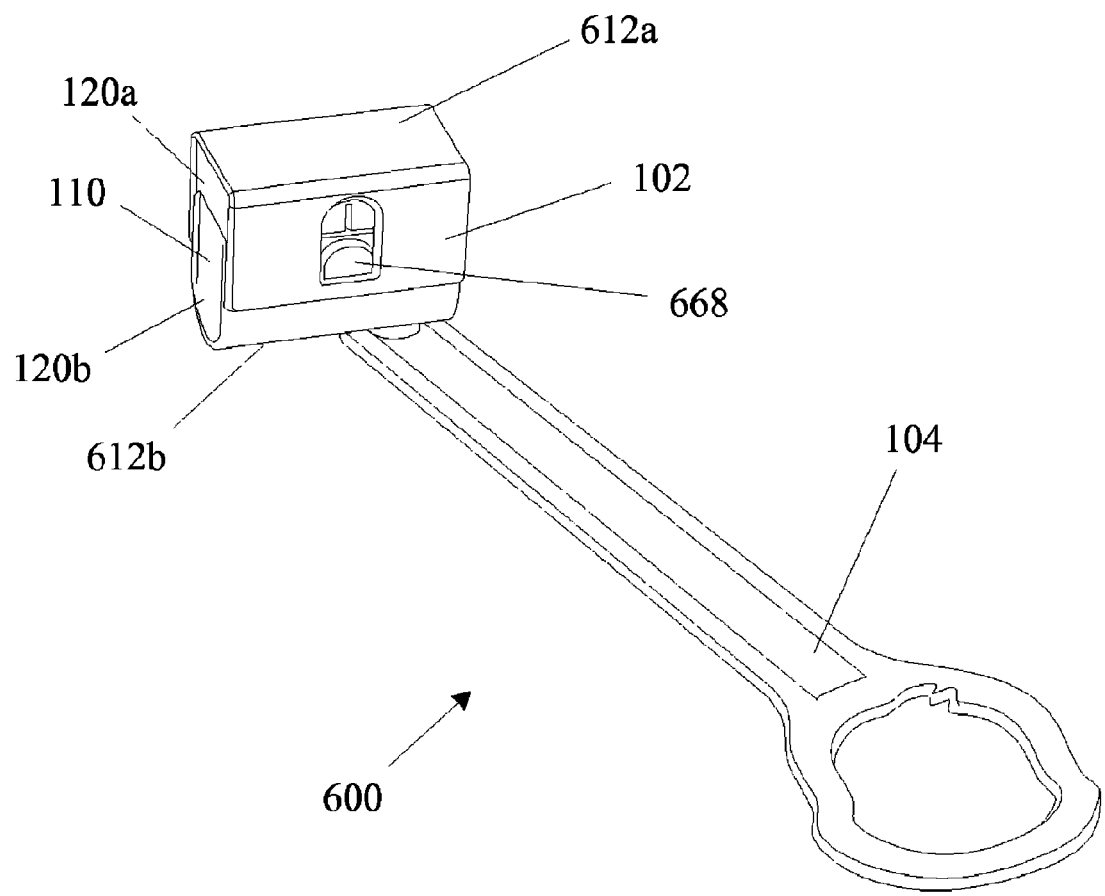
FIG. 6A depicts a second exemplary embodiment of a faucet handle extender, in accordance with some embodiments of the present disclosure.
Figure 6B:
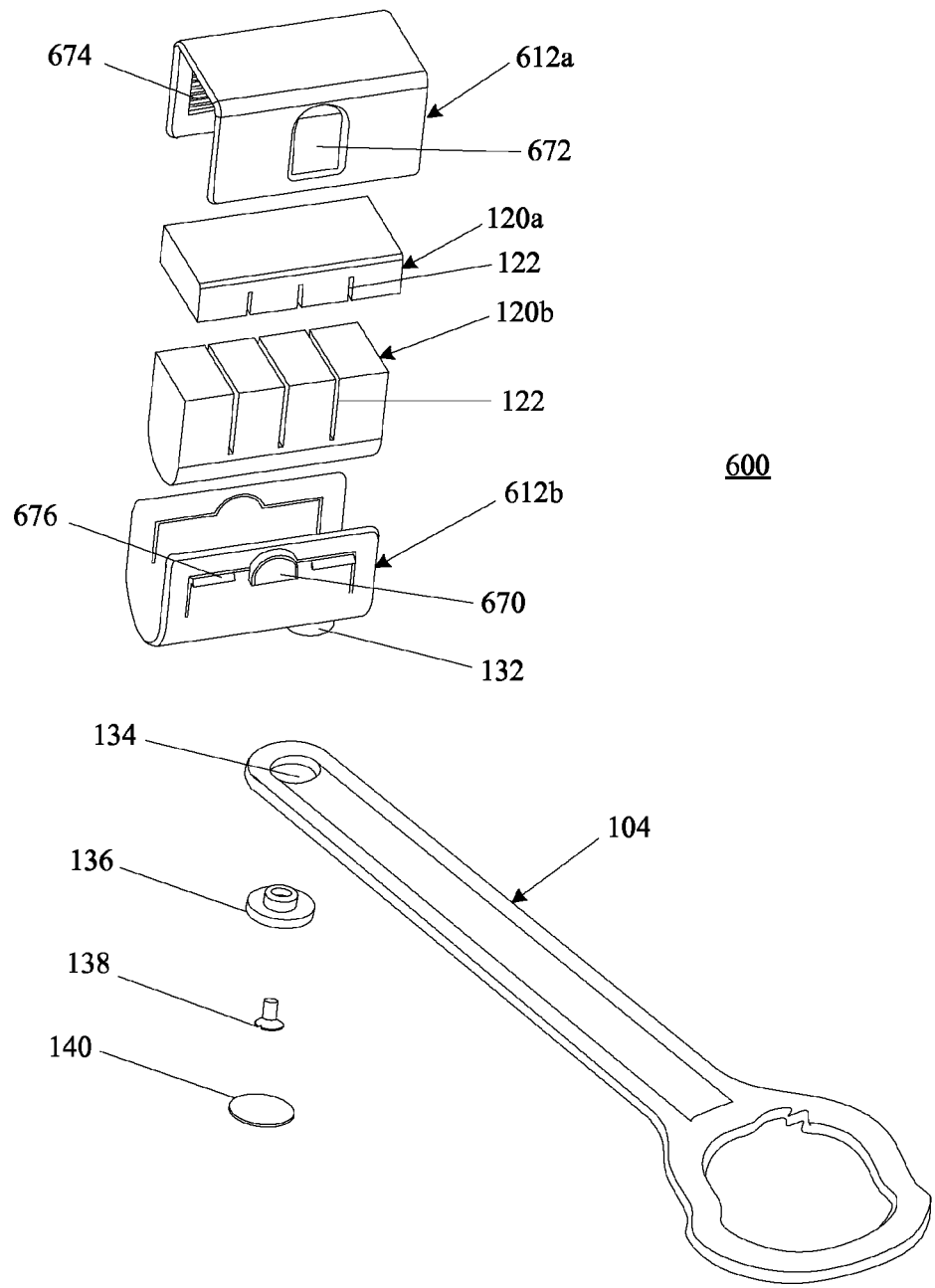
FIG. 6B depicts an exploded view of a second exemplary embodiment of a faucet handle extender, in accordance with some embodiments of the present disclosure.

By way of a non-limiting example, FIGS. 6A and 6B depict a second exemplary embodiment of a faucet handle extender 600. FIG. 6A depicts an isometric view of the second exemplary embodiment in an assembled form, and FIG. 6B depicts an exploded view of the second exemplary embodiment. In this second exemplary embodiment, the attachment unit 102 can comprise an upper shell 612a and a lower shell 612b. In some embodiments, the upper shell 612a and the lower shell 612b can each have cross sections, from the front end to the back end, substantially in the shape of the letter "U," but facing opposite directions. Thus, a cross section of shell 612b faces up and a cross section of shell 612a faces down, as depicted in FIGS. 6A and 6B. The interior of one of the shells 612 can have substantially the same width as the exterior of the other shell 612, such that the wider of the two shells can be fit over the other shell to form an interior space 110 partially defined by the opposing "U" shapes. The interior space 110 of the attachment unit 102 can be configured to at least partially accept a faucet handle 106. The attachment unit 102 can comprise an upper cushion 120a configured to be coupled with the underside of the upper shell 612a, and a lower cushion 120b configured to be coupled with the upper side of the lower shell 612b.

In this second exemplary embodiment, the connection mechanisms 114 can be latches 668 comprising nubs 670 and latch apertures 672, as depicted in FIG. 6B. The lower shell 612b can have nubs 670 that can be latched into latch apertures 672 on shell 612a to secure the shells 612 together. The nubs 670 can be pressed toward the center of the interior space 110 of the attachment unit 102 to separate the shells 612 from one another.

In some embodiments, the tightening mechanism 118 can be a plurality of grooves 674 in the interior of the upper shell 612a and one or more ridges 676 extending from the exterior of the lower shell 612b. The ridges 676 can interact with the grooves 674 to keep the upper shell 612a in a fixed position relative to the lower shell 612b. As the upper shell 612a is lowered onto the lower shell 612b, the ridges 676 can interact with progressively higher grooves 674, thereby progressively tightening attachment unit 102. The grooves 674 and ridges 676 can be used to ensure that the shells 612 stay at one of a plurality of fixed positions relative to one another after the dimensions of the interior space 110 have been adjusted.

Figure 7:
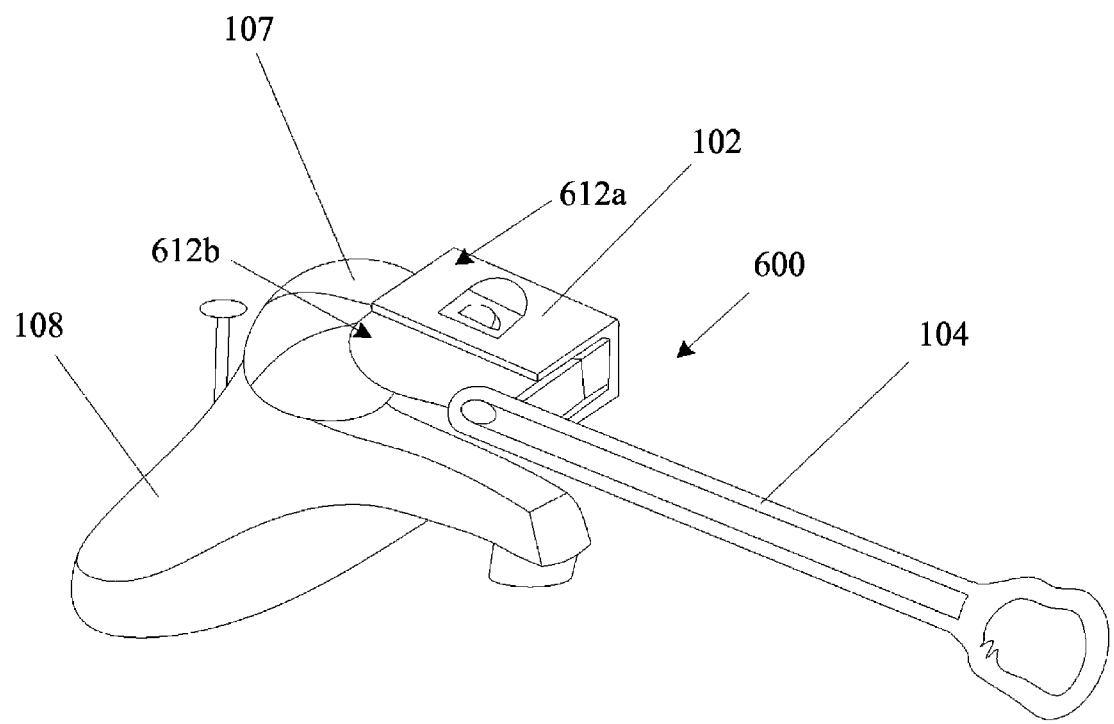
FIG. 7 depicts an exemplary embodiment of faucet handle extender in use with a single handle faucet, in accordance with some embodiments of the present disclosure.

FIG. 7 depicts an exemplary embodiment of a faucet handle extender 600 in use with single faucet handle 107 of faucet 108. As depicted in FIG. 7, single faucet handle 107 is the only faucet handle for faucet 108. Since faucet handle 107 in FIG. 7 is a single faucet handle, the orientation of the faucet handle is different from the exemplary faucet handles depicted in FIG. 1. However, as shown in FIG. 7, the exemplary faucet handle extender depicted in FIGS. 6A and 6B can still be used on the single faucet handle 107. As shown in FIG. 7, in some embodiments, faucet handle extender 600 is coupled to single faucet handle 107 such that shells 612a and 612b engage and/or clasp single faucet handle 107 with the "U" shapes facing sideways in opposite directions. Thus, in some embodiments and as shown in FIG. 7, tightening mechanism 114, e.g. latches 668, of attachment unit 102 faces up when the attachment unit 102 is coupled to single faucet handle 107, and extension piece 104 attaches to the "bottom" of shell 612b, which is facing a side of single faucet handle 107. Therefore, in some embodiments, the faucet handle 600 depicted in FIGS. 6A and 6B can engage a single faucet handle 107 by being rotated onto its side and engaging the "top" and "bottom" shells of attachment unit 102 with the sides of single handle faucet 107, as shown in FIG. 7.

Figure 8A:
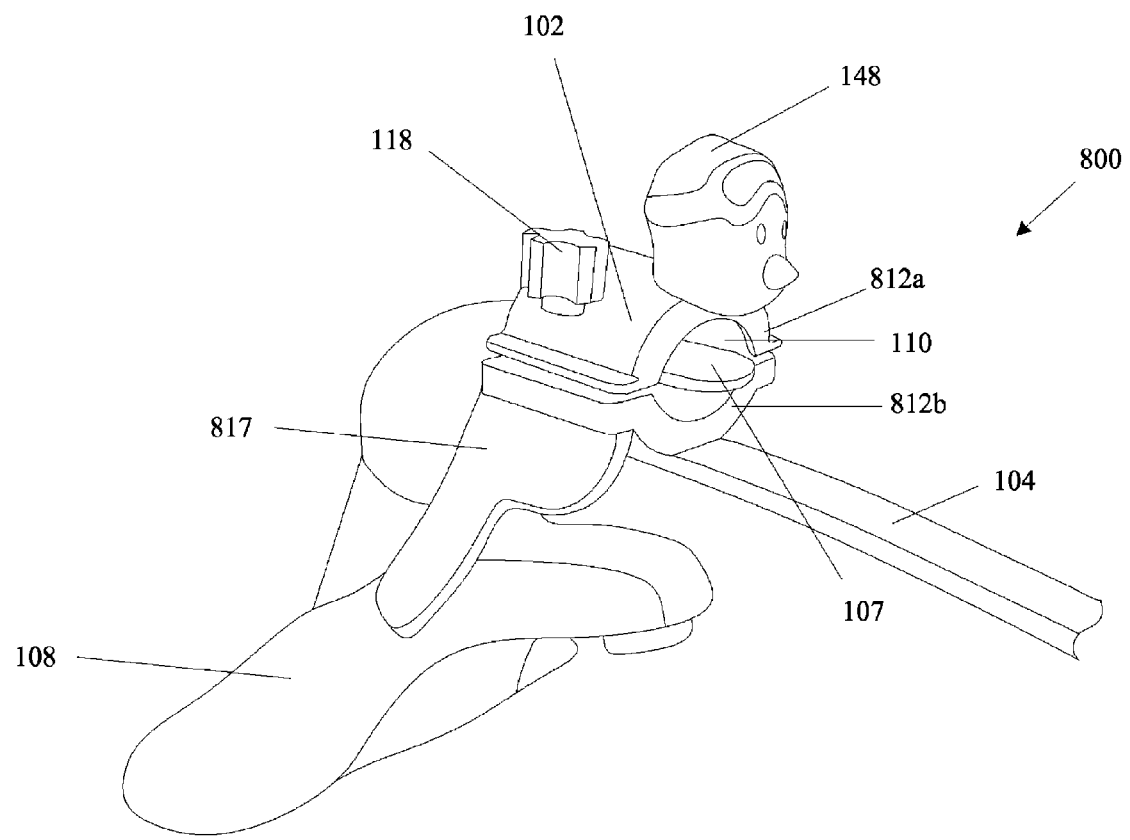
FIG. 8A depicts yet another exemplary embodiment of faucet handle extender in use with a single handle faucet, in accordance with some embodiments of the present disclosure.
Figure 8B:
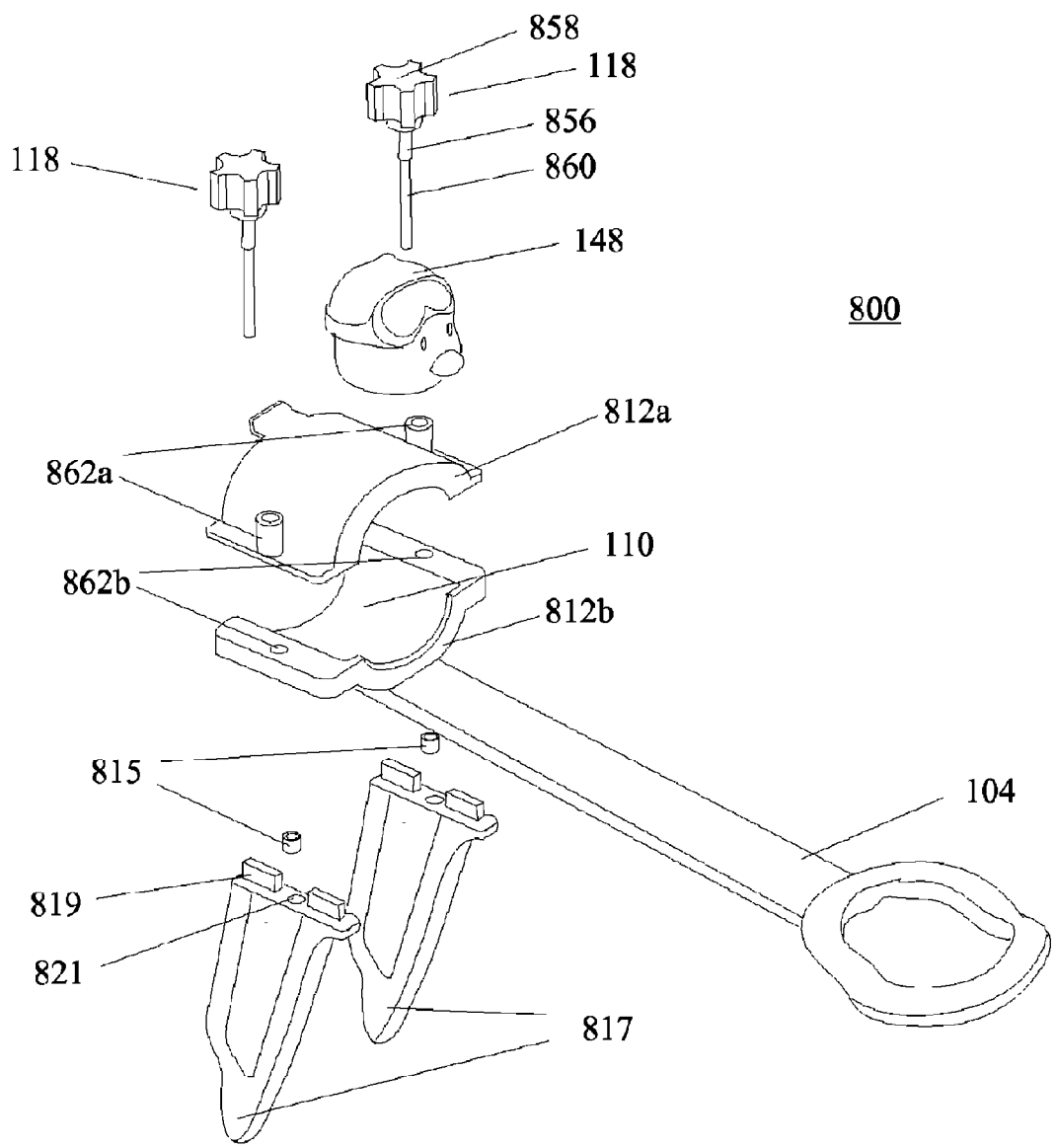
FIG. 8B depicts an exploded view of an exemplary embodiment of faucet handle extender for use with a single handle faucet, in accordance with some embodiments of the present disclosure.

By way of a non-limiting example, FIGS. 8A and 8B depict another exemplary embodiment of faucet handle extender 800 for use with a single faucet handle 107. FIG. 8A depicts an isometric view of the exemplary embodiment in an assembled form in use with single faucet handle 107, and FIG. 8B depicts an exploded view of the exemplary embodiment depicted in FIG. 8A. In this first exemplary embodiment, the attachment unit 102 can comprise an upper shell 812a and a lower shell 812b. In some embodiments, the upper shell 812a and the lower shell 812b can be shaped in opposing arcs, such that the interior space 110 is at least partially defined by the concavity of the arcs of the shells 812 and a faucet handle 107 can be placed within the interior space 110. In some embodiments, one or more cushions (not shown) are coupled to the interior surfaces of shells 812 of attachment unit 102, similar to how cushions 120 are coupled to shells 512, as depicted in FIGS. 5A and 5B.

In some embodiments, extension piece 104 is coupled with attachment unit 102. In some embodiments, because faucet handle 107 is a single faucet handle, extension piece 104 is oriented such that extension piece 104 is parallel or extending in approximately the same direction as faucet handle 107 when coupled with faucet handle extender 800, as shown in FIG. 8A. In some embodiments, extension piece 104 is rotatably coupled to attachment unit 102. In other embodiments, extension piece 104 is fused with attachment unit 102 or is coupled such that a certain amount of movement of the extension piece 104 necessarily moves the attachment unit 102 the same amount.

In some embodiments, the connection mechanism 114 can be a hinge, similar to hinge 550 in FIGS. 5A and 5B, but located on one side. In other embodiments, connection mechanism 114 is replaced by second tightening mechanism 118, as shown in FIG. 8B. In such embodiments, the two tightening mechanisms 118 serve two functions: 1) an adjustable tightening function and 2) a detachable/undetachable connection function. Thus, in some embodiments, two tightening mechanisms 118, e.g. screws, are used to connect the top shell 812a to the bottom shell 812b and are also used to fasten attachment unit 102 to faucet handle 107. As depicted in FIGS. 8A and 8B, the tightening mechanism 118 can be a screw 856, similar to screw 556 in FIG. 5B. The screw 856 can comprise a screw head 858 and a bolt 860, as shown in FIG. 8B. The bolt 860 can be at least partially threaded. Each shell 812 can comprise one or more tightening apertures 862 located on a side of attachment unit 102. For example, as shown in FIG. 8B, upper shell 812a includes two apertures 862a, located on each side of shell 812a, and lower shell 812b includes two apertures 862b located on each side of shell 812b. The tightening apertures 862 can have a diameter capable of accepting the bolts 860 of the screw 856. In some embodiments, the apertures 862a on shell 812a align with apertures 862b on shell 812b such that bolts 860 of screws 856 can be inserted through the aligned apertures. In some embodiments, one or more of the tightening apertures 862 can be threaded.

In some embodiments, one or more restricting mechanisms 817 are coupled to attachment unit 102. In such embodiments, one function for restricting mechanisms 817 is to restrict the movement of faucet handle 107 or prevent faucet handle 107 from swiveling past a certain number of degrees in a certain direction. Since faucet handle 107 is a single faucet handle, faucet handle 107 controls cold and hot water. In some implementations of faucets, the temperature of the water is determined by the degree with which a faucet handle swivels or rotates to the left or right. Hence, restricting mechanisms 817 serve to restrict faucet handle 107 from swiveling too far in either direction, thus helping guard against accidental scalding by hot water. In some embodiments, restricting mechanisms 817 include protrusions 819 that fit into aligned notches or grooves in attachment unit 102, in order to help stabilize the coupling with attachment unit 102 and to help strengthen the restricting ability/force of restricting mechanisms 817. For example, in FIG. 8B, protrusions 819 on restricting mechanisms 817 fit into notches (not shown) on the underside of lower shell 812b. In some embodiments, restricting mechanisms 817 also contain aperture 821. In some embodiments, aperture 821 is aligned with tightening apertures 862 and is large enough such that bolt 860 of screw 856 can be inserted through aperture 821 after passing through apertures 862. In some embodiments, aperture 821 is at least partially threaded. In some embodiments, intermediate washer piece 815 is inserted in between aperture 862b and aperture 821. In such embodiments, washer piece 815 has an aperture with a diameter equal to the diameter of aperture 821. In some embodiments, washer piece 815 is at least partially threaded. In some embodiments, washer piece 815 serves to guide bolt 860, to hide bolt 860 from view, and/or to provide further structural support for the connection between restricting mechanisms 817 and attachment unit 102.

In some embodiments, the restricting mechanisms 817 are made of polyethylene. In other embodiments, restricting mechanisms 817 are comprised of polycarbonate material, acrylonitrile butadiene styrene, metal, metal alloy, plastic, polyvinyl chloride, wood, ceramic, glass, or any other material or combination of materials. In some embodiments, the restricting mechanisms 817 can be comprised of waterproof and/or water resistant materials. In some embodiments, any or all portions of the restricting mechanisms 817 can be covered in and/or coated with rubber, plastic, foam, or any other material.

In some embodiments, restricting mechanism 817 is oriented such that when faucet handle extender 800 is rotated or swiveled to the left or right, the restricting mechanisms 817 on either side act as guards, pressing against faucet 108 and generating forces opposing movement of faucet handle 107 past faucet 108 in either direction. In other embodiments, faucet handle 800 only includes one restricting mechanism 817, thereby restricting faucet handle 107 from moving past faucet 108 in only one direction, e.g. the direction towards hot water, and allowing free movement of faucet handle 107 past faucet 108 in the other direction. Still in other embodiments, faucet handle extender 800 does not include any restricting mechanisms. In some embodiments, restricting mechanisms 817 are removable from the attachment unit 102. Alternatively, in some embodiments, restricting mechanisms 817 are fused to attachment unit 102 or coupled such that the restricting mechanisms cannot be removed. In some embodiments, restricting mechanisms 817 are adjustable such that the degree of restriction is variable.

In operation, each of the one or more bolts 860 can extend through the attachment unit 102 from above the upper shell 812a through the tightening aperture 862a of the upper shell 812a and the tightening aperture 862b of the lower shell 812b, through the threaded washer piece 815, and/or through the threaded aperture 821 of the restricting mechanism 817. The screw heads 858 can be turned to adjust the width of the space between the upper shell 812a and the lower shell 812b, thereby adjusting the dimensions of the interior space 110. In some embodiments, attachment unit 102 includes two tightening mechanisms 118, e.g. screws 856, located on each side of attachment unit 102. In other embodiments, attachment unit 102 includes one tightening mechanism 118 on one side of attachment unit 102, and the other side can be fused together (thus, shell 812 is just one single piece), or connected together via a connection mechanism 114, e.g. a hinge.

In operation, a user can install a faucet handle extender 100/600/800 by placing a faucet handle 106/107 into the interior space 110 at least partially defined by the attachment unit 102 and then securing the attachment unit 102 to the faucet handle 106/107. In some embodiments, the tightening mechanisms 118 can be used to adjust the interior space 110 around the faucet handle 106/107 to create a tighter fit around the faucet handle. In some embodiments, such as the embodiments shown in FIGS. 5-8, the tightening mechanisms 118 can be operated to move the shells closer together, thereby compressing the cushions 120 around the faucet handle 106/107 and creating a tight fit.

During installation, the orientation of the faucet handle can determine the orientation of the attachment unit 102. The extension piece 104 can be oriented and/or rotated such that the distal end 128 is directed away from the faucet and substantially toward the front edge of a sink and/or to a location accessible to a user.

In operation, a user can push, pull, lift, drop, rotate, or otherwise move any convenient portion of the extension piece 104. The movement of the extension piece 104 can in turn move the attachment unit 102, which in turn can move the faucet handle 106/107 to operate the faucet 108. The faucet handle extender 100/600/800 can therefore be used to operate a faucet 108 to start water flow, stop water flow, adjust water flow rate, adjust water temperature, or operate any other functionality of the faucet 108 that is controlled by a faucet handle 106/107, without the user needing to reach the faucet handle 106/107 itself.

In some embodiments, the faucet 108 can have two or more faucet handles 106, as shown in FIG. 1. In alternate embodiments, the faucet 108 can have a single faucet handle 107, as shown in FIG. 7. In embodiments with a plurality of faucet handles 106, a user can use a separate faucet handle extender 100 for each faucet handle 106. In other embodiments, a user can choose to use a faucet handle extender 100 only with the faucet handle 106 that controls cold water, such that a child can only access cold water and cannot access hot water. In some embodiments in which the faucet handle extender 100 is configured to only be used with the faucet handle 106 that controls cold water, a stopper 116 can be coupled with the attachment unit 102 such that the attachment unit 102 can only be coupled with the faucet handle 106 that controls cold water, and a warning message can be displayed on the underside of the extension piece 104 or in any other location such that the warning message can be viewed from above if the faucet handle extender 100 is installed upside down on the faucet handle 106 that controls hot water. In some embodiments, the warning message can read "WRONG WAY—DO NOT USE WITH HOT WATER FAUCET HANDLE." In other embodiments, the warning message can be any other desired message.

In some embodiments, the faucet handles 106/107 can be integral with the faucet 108. In alternate embodiments, the faucet handles 106/107 can be separate from the faucet 108. In some embodiments, the faucet handles 106/107 can be oriented horizontally. In other embodiments, the faucet handles can be oriented vertically. In still other embodiments, the faucet handles can be oriented in any direction. In some embodiments, the faucet handles can be lever style handles. In alternate embodiments, the faucet handles can be knobs, dials, or any other type of handle. In some embodiments, the faucet 108 can be operated with a sink, shower, bathtub, outdoor spigot, or any other type of faucet. In alternate embodiments, the faucet handle extender can be used with non-faucet handles, such as door handles, appliance handles, or any other type of handle.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A faucet handle extender comprising:
   an attachment member configured to selectively couple with a faucet handle, the attachment member including an interior space into which the faucet handle is inserted during coupling,
      wherein the attachment member also includes one or more outer shells that at least partially define the interior space, the one or more outer shells including a tightening mechanism for adjusting the interior space that is at least partially defined by the one or more outer shells, wherein the attachment member further includes one or more cushions coupled to the interior surfaces of the one or more outer shells, the one or more cushions comprising a compressible material such that the one or more cushions can deform to fit around multiple types of faucet handles;

an extension member rotatably coupled with said attachment member such that the extension member can rotate around relative to the attachment member, the extension member including a proximate end and a distal end relative to the coupling point between the extension member and the attachment member, wherein the extension member includes an aperture that extends through the distal end of the extension member;

wherein movement of said extension member causes movement of said faucet handle.

2. The faucet handle extender of claim 1, wherein the attachment member further includes a protrusion and the extension member includes an attachment aperture configured to accept the protrusion while the attachment member is coupled to the extension member.

3. The faucet handle extender of claim 2, wherein the extension member is coupled to the attachment member such that the extension member can swivel around the protrusion.

4. The faucet handle extender of claim 1, wherein the attachment member comprises at least two outer shells coupled together via a hinge mechanism.

5. The faucet handle extender of claim 1, wherein the attachment member comprises a single, substantially "U" shaped, shell configured such that the faucet handle is inserted through the center of the "U" shape during coupling with the attachment member.

6. The faucet handle extender of claim 1, wherein the extension member is coupled to the attachment member such that pulling on the extension member while the attachment member is coupled with the faucet handle causes the attachment member and the faucet handle to rotate around an axis perpendicular to the length of the extension member.

7. The faucet handle extender of claim 1, wherein the distal end of the extension member is wider than a middle section of the extension member.

8. The faucet handle extender of claim 1, further comprising one or more restricting members coupled with either the attachment member or the extension member, wherein the one or more restricting members are configured to prevent the extension member from moving in a particular direction when coupled to the faucet handle.

9. The faucet handle extender of claim 1, further comprising a blocking mechanism attached to the attachment member or the extension member, wherein the blocking mechanism is configured to prevent the attachment member from coupling with the faucet handle in a particular orientation.

10. A faucet handle attachment unit comprising:
an outer shell at least partially defining an interior space, wherein the outer shell is configured such that a faucet handle can be inserted through the interior space, allowing the faucet handle attachment unit to couple with the faucet handle,
wherein the outer shell includes a tightening mechanism for adjusting the interior space that is at least partially defined by the outer shell,
wherein the handle attachment unit further includes one or more cushions coupled to the interior surfaces of the outer shell, the one or more cushions comprising a compressible material such that the one or more cushions can deform to fit around multiple types of faucet handles;

wherein the handle attachment unit is configured to be rotatably coupled to an extension unit such that the extension unit can rotate around relative to the handle attachment unit, the extension unit including a proximate end and a distal end relative to the coupling point between the extension unit and the faucet handle attachment unit, wherein the extension unit includes an aperture that extends through the distal end of the extension unit.

11. The faucet handle attachment unit of claim 10, wherein the attachment unit further includes a protrusion and the extension unit includes an attachment aperture configured to accept the protrusion while the attachment unit is coupled to the extension unit.

12. The faucet handle attachment unit of claim 11, wherein the extension unit is coupled to the attachment unit such that the extension unit can swivel around the protrusion.

13. The faucet handle attachment unit of claim 10, wherein the one or more cushions comprises neoprene, rubber, sponge, foam, or any other combination of compressible materials that allow the faucet handle attachment unit to couple with various types and shapes of faucet handles.

14. The faucet handle attachment unit of claim 10, wherein the outer shell comprises two or more outer shell pieces connected through a connection mechanism.

15. The faucet handle attachment unit of claim 14, wherein the connection mechanism comprises one or more latches, locks, switches, hinges, snaps, bolts, screws, adhesives, hooks, fasteners, or any other connection device.

16. The faucet handle attachment unit of claim 10, further comprising a fastening mechanism to fasten the faucet handle attachment unit to the extension unit.

17. The faucet handle attachment unit of claim 16, wherein the fastening mechanism comprises a washer, screw, end cap, or any other mechanisms for securing the faucet handle attachment unit to the extender unit while still allowing the extender unit to swivel around an axis perpendicular to the extender unit.

18. The faucet handle attachment unit of claim 10, further comprising one or more restricting members coupled to the attachment unit, wherein the one or more restricting members are configured to prevent the extension unit from moving in a particular direction when coupled to the faucet handle.

19. The faucet handle attachment unit of claim 10, further comprising a blocking mechanism attached to the attachment unit, wherein the blocking mechanism is configured to prevent the attachment unit from coupling with the faucet handle in a particular orientation.

20. A combined system comprising:
a faucet handle; and
a faucet handle extender coupled to the faucet handle, the faucet handle extender comprising:
an attachment member configured to selectively couple with the faucet handle, the attachment member including an interior space into which the faucet handle is inserted during coupling,
wherein the attachment member also includes one or more outer shells that at least partially define the interior space, the one or more outer shells including a tightening mechanism for adjusting the interior space that is at least partially defined by the one or more outer shells,
wherein the attachment member further includes one or more cushions coupled to the interior surfaces of the one or more outer shells, the one or more cushions comprising a compressible material such that the one or more cushions can deform to fit around multiple types of faucet handles;

an extension member rotatably coupled with said attachment member such that the extension member can rotate around relative to the attachment member, the extension member including a proximate end and a distal end relative to the coupling point between the extension member and the attachment member, wherein the extension member includes an aperture that extends through the distal end of the extension member;

wherein movement of said extension member causes movement of said faucet handle.

\* \* \* \* \*